Nov. 11, 1969 S. E. ZOCHOLL ET AL 3,478,250

STATIC A.C. SWITCHING CIRCUIT

Filed Oct. 9, 1967 4 Sheets-Sheet 1

INVENTORS
STANLEY E. ZOCHOLL
RICHARD R. CONRAD

BY

OSTROLENK, FABER, GERB & SOFFEN
ATTORNEYS

INVENTORS
STANLEY E. ZOCHOLL
RICHARD R. CONRAD
BY
OSTROLENK, FABER, GERB & SOFFEN
ATTORNEYS

Nov. 11, 1969 S. E. ZOCHOLL ET AL 3,478,250

STATIC A.C. SWITCHING CIRCUIT

Filed Oct. 9, 1967 4 Sheets-Sheet 3

INVENTORS
STANLEY E. ZOCHOLL
BY RICHARD R. CONRAD

OSTROLENK, FABER, GERB & SOFFEN
ATTORNEYS

Nov. 11, 1969 S. E. ZOCHOLL ET AL 3,478,250

STATIC A.C. SWITCHING CIRCUIT

Filed Oct. 9, 1967 4 Sheets-Sheet 4

United States Patent Office 3,478,250
Patented Nov. 11, 1969

3,478,250

STATIC A.C. SWITCHING CIRCUIT

Stanley E. Zocholl, Holland, and Richard R. Conrad, Flourtown, Pa., assignors, by mesne assignments, to I-T-E Imperial Corporation, Philadelphia, Pa., a corporation of Delaware Filed Oct. 9, 1967, Ser. No. 673,583
Int. Cl. H02h 7/00; H01h 47/32
U.S. Cl. 317—33 9 Claims

ABSTRACT OF THE DISCLOSURE

This invention teaches a solid state A.C. switching circuit provided for the purpose of switching ON or switching OFF a reactive load through the application of a diode bridge network in combination with a semiconductor device such as, for example, a silicon controlled rectifier. In one application, let it be assumed that the inductive load is normally OFF. The inductive load is coupled in series with a parallel-connected diode bridge network and silicon controlled rectifier. An A.C. source is coupled in series with the reactive load and the parallel connected SCR and diode bridge network. Suitable means is provided for triggering the SCR to conduct. In order to sustain conduction of the SCR beyond one half-cycle of the A.C. source which generates a sinusoidal voltage, a second diode bridge network is coupled in parallel with the first parallel-connected circuit, and a resistor is coupled between its common terminal and the source to place the resistive circuit in parallel with the reactive circuit. This causes the supply current to divide itself so as to pass through both the resistive and the reactive branches of the circuit once a trigger pulse is applied to the SCR gate electrode. Since the currents through the resistive and reactive networks are always out of phase with one another, the current passing through the SCR will always be positive and greater than zero, so that the SCR will be retained in its conductive state. By providing normally closed switch means in either the resistive or the reactive network, the conduction of the SCR may be interrupted simply by opening the normally closed switch, thus providing accurate control over the number of half-cycles during which the SCR will be retained in its conductive state.

The instant invention relates to switches, and more particularly, to a novel solid state switching means for use in an A.C. circuit for controlling the duration at which current will be supplied to a reactive load.

The development of solid state devices such as diodes, transistors, silicon controlled rectifiers, and the like, has led to the development of a variety of switching circuits for controlling the turn-on and turn-off of a load circuit selectively coupled to a power source. There exists in the present state of the art a solid state circuit for controlling coupling of the reactive load to an A.C. source comprised of a diode bridge network coupled in parallel with a silicon controlled rectifier, which, in turn, is series-connected with a reactive load and a power source capable of generating a sinusoidally varying signal. The silicon controlled rectifier is normally in cut-off and is turned on through the application of a trigger voltage through its gate electrode. The A.C. source passes a sinusoidally varying current through selected diodes of the diode bridge network and the SCR and reactive load. However, as soon as sinusoidally varying current passes through a zero reference level causing a switching of the diodes in the diode bridge, the SCR is turned off, thereby causing the current passing through the reactive load to be sustained for only one half-cycle, or less. Thus, the only way of sustaining flow of current through the load circuit is through the application of a trigger pulse to the gate electrode of the silicon controlled rectifier at the point when the current flowing through the circuit passes through zero reference level. Such a circuit would be extremely complex, causing its design and construction to be prohibitive.

The instant invention is characterized by providing a second diode bridge network and a non-reactive branch circuit coupled between the silicon controlled rectifier and the power source which is capable of indefinitely sustaining conduction of the SCR through as many half-cycles of the sinusoidally varying current as is desired. Interruption of the current may be very simply and easily obtained through the provision of either mechanical or solid state switch means in either of the two branch circuits referred to above which, upon opening thereof, will cause the SCR to be rendered non-conductive at the first point in time at which the circuit current passes through the zero reference level after opening of the switch means.

The instant invention is comprised of a diode bridge network having a first pair of terminals and a second pair of terminals. A sinusoidally varying power source and a load circuit are connected in series across the first pair of terminals. A silicon controlled rectifier is coupled across the second pair of terminals. A second diode bridge network has a first pair of terminals and a common terminal. The first pair of terminals of said second diode bridge network is coupled across the second pair of terminals of said first diode bridge network, and a resistive branch circuit is coupled between its common terminal and the power source. Means are provided for application of a trigger voltage to the gate electrode of the SCR. At least one switch means is provided in either the load circuit or the second branch network, and the switch means is in the normally closed position in the load branch circuit when it is desired to have the load branch circuit normally disconnected from the power source.

The switch means is in the normally open position when connected in the second branch circuit, and is closed when it is desired that the load branch circuit normally be connected to the sinusoidally varying power source.

In the case where the load branch circuit is normally disconnected from the power source and it is desired to connect the load branch circuit to the power source and sustain conduction of current therethrough for more than one half-cycle of current, a trigger voltage is applied to the gate electrode of the silicon controlled rectifier. This causes the silicon controlled rectifier to turn ON, thereby causing positive half-cycles of current to pass through the silicon controlled rectifier. The elements of the load branch circuit and the second branch circuit are selected so that the currents passing therethrough are normally out of phase, so that the resultant current passing through the silicon controlled rectifier will always be positive and greater than zero at any given instant so that conduction of the silicon controlled rectifier will be sustained indefinitely. The silicon controlled rectifier may be driven into cut-off by opening the switch means in either the load branch circuit or the second branch circuit so that the resultant current passing through the silicon controlled rectifier will pass through a zero reference level.

The power source will remain coupled to the load and second branch circuits (i.e. conduction of the silicon controlled rectifier will be sustained) so long as the currents passing through the load and second branch circuits are always out of phase with one another. For example, the load circuit may be primarily reactive, while the second branch circuit may be resistive, or vice versa.

In one application, the load branch circuit may be primarily inductive reactance, with the inductance being the solenoid employed for tripping or opening a circuit breaker. In most cases, it is important to sustain the conduction of the silicon controlled rectifier for a period greater than one half-cycle of the sinusoidally varying source. The tripping of the circuit breaker may then be employed to control the opening of a normally closed switch provided in series with the load branch circuit to terminate conduction of the silicon controlled rectifier.

In applications where the load branch circuit is comprised primarily of reactive impedance, the normally open switch may be provided in the second branch circuit. The closure of this switch, coupled with the application of a trigger voltage to the gate electrode of the silicon controlled rectifier, will cause a sinusoidally varying current to pass through the load branch circuit. The circuit of the instant invention may, therefore, be employed as a solid state circuit breaker in which the switch in the second branch circuit may be opened to interrupt the flow of current to the load branch circuit, thus completely avoiding the need for providing switch means directly connected with the circuit being protected, while at the same time permitting substantially high-speed interruption of the current flow thereto, which interruption will take place within a period no longer than one half-cycle of the frequency of the power source.

The switch means in the second branch circuit may either be mechanical switch means or solid state switch means, depending only upon the needs of the user.

It is, therefore, one object of the instant invention to provide a novel A.C. switching circuit for use in selectively controlling the coupling of a load circuit to an A.C. power source wherein means are provided for indefinitely sustaining the flow of current to the load circuit from the power source.

Another object of the instant invention is to provide novel solid state switching means for selectively coupling a load circuit to a sinusoidally varying power source comprising a silicon controlled rectifier and means coupled between the silicon controlled rectifier and the power source for sustaining the flow of current to the load circuit after the trigger voltage applied to the gate electrode of the silicon controlled rectifier has been removed.

Yet another object of the instant invention is to provide novel solid state switching means for selectively coupling a load circuit to a sinusoidally varying power source comprising a silicon controlled rectifier and means coupled between the silicon controlled rectifier and the power source for sustaining the flow of current to the load circuit after the trigger voltage applied to the gate electrode of the silicon controlled rectifier has been removed, and further comprising switch means coupled in either the load circuit or the means coupled between the silicon controlled rectifier and the power source for controlling the interruption of current flow to the load circuit from the power source.

Still another object of the instant invention is to provide novel solid state switch means for selectively coupling a load circuit to a sinusoidally varying power source comprising a silicon controlled rectifier and means coupled between the silicon controlled rectifier and the power source for sustaining the flow of current to the load circuit after the trigger voltage applied to the gate electrode of the silicon controlled rectifier has been removed and further comprising switch means coupled in either the load circuit or the means coupled between the silicon controlled rectifier and the power source for controlling the interruption of current flow to the load circuit from the power source, said switch means being of either the mechanical or solid state type.

These and other objects of the instant invention will become apparent when reading the accompanying description and drawings in which:

FIGURE 1 is a schematic diagram showing a conventional solid state A.C. switching circuit.

FIGURE 2*a* is a diagrammatic drawing showing a tripping arrangement which may be used with the circuit of FIGURE 2*b*.

FIGURES 2*b*–2*e* are schematic diagrams showing a solid state A.C. switching circuit designed in accordance with the principles of the instant invention the multiple views of which are shown to explain circuit operation.

Figure 1:
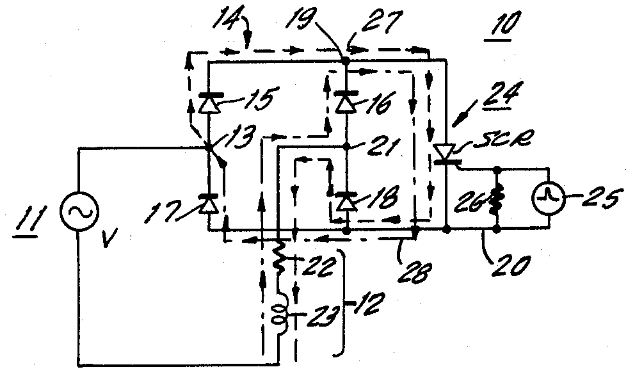
FIG. 1 PRIOR ART

Referring now to the drawings, FIGURE 1 shows a conventional solid state A.C. switching circuit 10 for controlling the coupling of a power source 11 to a load circuit 12. The power source 11 may be any suitable generating means capable of generating a sinusoidally varying signal such as, for example, a 110 volt 60 cycle source. Obviously, the magnitude of the voltage may be at any suitable level, depending upon the demands of the load circuit 12. Likewise, frequency of the signal may be greater or smaller than 60 cycles per second. However, it is conventional to generate power in large scale power transmission systems at a frequency of 60 cycles per second. The application of the circuit, however, is dependent only upon the needs of the user, and any other repetition rate and voltage amplitude may be employed.

The power source has a first terminal thereof coupled to one terminal 13 of a diode bridge network 14 comprised of diodes 15–18, respectively. The diode bridge network is coupled so that the anode and cathode terminals of diodes 15 and 17, respectively, are coupled to common terminal 13; the cathode terminals of diodes 15 and 16 are coupled in common to terminal 19; the anode terminals of diodes 17 and 18 are coupled in common to bus 20; and the anode and cathode terminals of diodes 16 and 18, respectively, are coupled in common to terminal 21

Terminal 21 is connected to the resistor element 22 which is connected in series with inductor 23, elements 22 and 23 comprising the load circuit 12. The lower terminal of inductor 23 is coupled to the remaining terminal of power source 11.

A silicon controlled rectifier (SCR) 24 has its anode and cathode terminals connected respectively, to buses 19 and 20. A trigger source 25 has its terminals connected between the gate electrode of SCR 24 and bus 20 respectively. A resistor 26 is coupled across trigger voltage source 25 to provide a path for thermally generated leakage currents in that the SCR will not turn on due to elevated temperatures. It should also be understood that the trigger pulse has only positive excursion.

The operation of the conventional circuit 10 of FIGURE 1 is as follows:

Let it be assumed that SCR 24 is normally non-conductive. The polarities of diodes 15–18 are, therefore, such as to prevent current from power source 11 to pass through the load circuit 12. For example, if terminal 13 at one given instant of time, is more positive than terminal 21, current will flow through diode 15 but will be blocked from flowing through diode 16. Since SCR 24 is turned off, no current path is provided for coupling the current flow to load circuit 12. If terminal 21 is, at one given instant of time, more positive than terminal 13, current will flow through diode 16, but will be blocked by the non-conductive SCR 24 and the polarity of diode 15.

Now let it be assumed that it is desired to provide a current path between power source 11 and load circuit 12. In order to initiate current flow, the trigger voltage source 25 is enabled so as to generate a pulse of appropriate polarity to be applied to the gate electrode of SCR 24 in order to turn it ON. Let it be assumed that the instant at which SCR 24 is turned ON, terminal 13 is more positive than terminal 21. Current will then flow from power source 11 through diode 15, SCR 24, diode 18, and load circuit 12 back to power source 11. This current path is indicated by the dotted line 27.

Since the pulse generated by the trigger voltage source 25 has a pulse duration which is just a small fraction of a half-cycle of the sinusoidally varying voltage source 11, pulse generated by source 25 will be removed before the first half-cycle has been completed. As soon as the first half-cycle passes through the zero reference level, the voltage across the anode and cathode terminals of SCR 24 will be zero, causing the SCR 24 to turn OFF before the next half-cycle of current begins. Thus, the current flow from power source 11 to load circuit 12 will be sustained through a maximum of only one half-cycle.

Let it be assumed that the trigger pulse source 25 is enabled at an instant of time when terminal 21 is more positive than terminal 13. Current will, therefore, flow from source 11 through load circuit 12, diode 16, SCR 24, and diode 17 to return to power source 11. This current path is shown by the phantom line 28. As soon as the sinusoidally varying current reaches the zero reference level, the voltage across the anode and cathode terminals of SCR 24 will be zero, causing SCR 24 to be driven into cut-off. Since the trigger voltage pulse will have terminated long before this time (relatively speaking), SCR 24 will be turned ON for a duration no longer than one half-cycle of current, and its conduction will not be sustained to persist through the next half-cycle of current. Thus, the circuit 10 of FIGURE 1, while being capable of selectively connecting an A.C. source 11 to a load circuit 12, is nevertheless incapable of sustaining the flow of current through more than one half-cycle thereof.

The circuit 30 of the instant invention, shown in FIGURES 2*b*–2*e* provides a solid state A.C. switching network capable of selectively coupling an A.C. power source 11 to a load circuit 12, and of sustaining current flow indefinitely through as many half-cycles of current as may be desired. Like elements as between FIGURES 1 and 2 are designated with like numerals, and their functions and operation are thereby substantially identical. The circuit of FIGURE 2*b* includes, in addition to the elements of circuit 10 of FIGURE 1, a second diode network 31 comprised of diodes 32 and 33 having their cathode and anode terminals respectively connected to the anode and cathode terminals of SCR 24. The anode and cathode terminals of diodes 32 and 33, respectively, are coupled to a common terminal 34 which, in turn, is coupled through resistor 35 to one terminal of power source 11.

The operation of the circuit 30 of FIGURE 2 differs from the circuit operation of FIGURE 1 in the following manner:

Let it be assumed that SCR 24 is normally non-conductive, and that the switch means 36 (to be more fully described) coupled in series with load circuit 12 is normally closed. With SCR 24 normally non-conductive, let it be assumed that terminal 13, at one given instant of time, is more positive than terminal 21. Current will thereby flow through diode 15, but will be blocked from flowing through diodes 16 and 32 due to their reversed polarity. No current will flow through SCR 24, due to the fact that it is in cut-off. Thus, no current can flow at this time from power source 11 to load circuit 12.

As a second example, let it be assumed that terminal 21 is more positive than terminal 13. Current will thereby want to flow through diode 16. However, such current will be blocked from flowing through diodes 15 and 32, due to their reversed polarity. Likewise, no current will flow through SCR 24, due to the fact that it is in cut-off. Thus, regardless of the polarity of the voltage power source 11, no current can flow between power source 11 and load circuit 12.

Let it now be assumed that it is desired to couple power from source 11 to the load circuit 12. The trigger voltage circuit 25 is enabled so as to couple a trigger pulse of appropriate polarity to the gate electrode of SCR 24, causing it to be turned ON.

Figure 3:
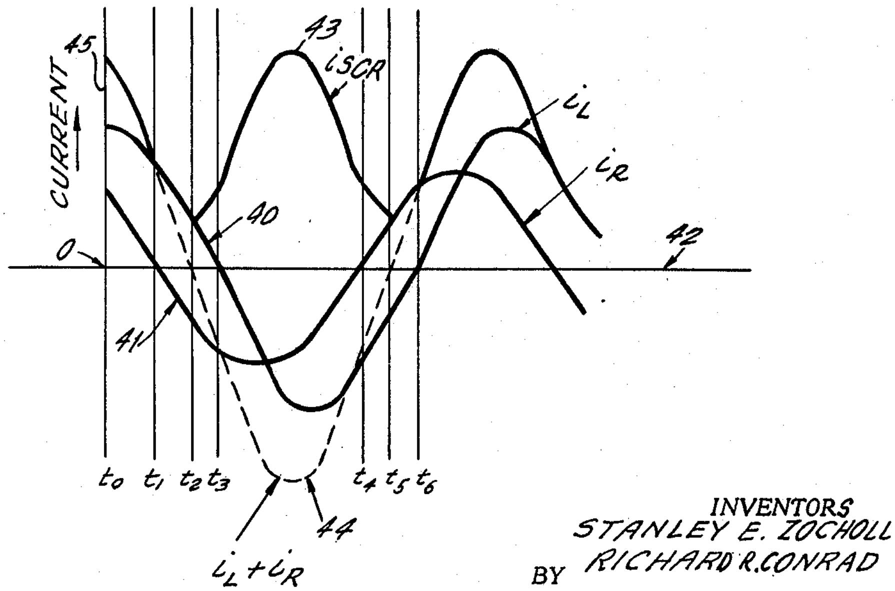
FIGURE 3 is a waveform diagram useful in describing the operation of the circuit of FIGURE 2.

With SCR 24 turned ON, the current $i_L$ in the load 12 and $i_R$ in the resistor 35 will assume the A.C. waveforms shown in FIGURE 3. In FIGURE 3, curve 41 is a plot of the instantaneous value of the current $i_R$ versus time. Curve 40 is a plot of the instantaneous values of $i_L$ versus time.

Curve 43 is a plot of the current in SCR 24 versus time. Curve 44 is the instantaneous sum of $i_L$ and $i_R$ and is the A.C. current flowing in the source 11. In all cases current is plotted along the vertical axis 45 and time is plotted along the horizontal axis 42. It is significant to note that the sine wave current curve 40 lags the sine wave current 41 since the load $i_L$ is inductive and $i_R$ is the current in a resistor.

It should be noted that the SCR current curve is always positive and has the following fundamental behavior:

(1) At a point in time where $i_L$ and $i_R$ have the same sign (i.e., are both positive or both negative) $i_{SCR}$ equals the sum of $i_R$ and $i_L$. This occurs in the time intervals $$(t_0<t<t_1) \text{ and } (t_3<t<t_4)$$

(2) At a point in time where $i_L$ and $i_R$ have opposite signs, $i_{SCR}$ equals the larger of the two (2) currents. This occurs in time intervals $$(t_1<t<t_3) \text{ and } (t_4<t<t_6)$$

(3) At a point in time where $i_L$ and $i_R$ are equal in value but of opposite sign $i_{SCR}$ equals $i_L$ which equals $i_R$. This occurs at $t=t_2$ and $t=t_5$.

It is fundamental to note that in the special case of condition 3 the source current is zero and that the inductive current feeds the resistor. At this point the SCR current is at its minimum value. The value of the resistance 35 is chosen so that this minimum current is equal to or greater than the holding current specified for the SCR used in the circuit.

Consideration of this point will be taken up in detail later in the discussion.

Noting the three (3) conditions above, the paths of the currents through the circuit can be described. In FIGURE 2*b* a current is considered positive when it flows upward in source 11 from source terminal 1 to source terminal 2. Consequently positive current returning to terminal 1 will flow downward through load 12 or resistor 35. Conversely negative current flows from terminal 2 in source 11 downward to terminal 1. Negative current returning to terminal 2 flows upward through load 11 or resistor 35.

In particular FIGURE 2*b* shows the current flow for the time interval $(t_0<t<t_1)$ in FIGURE 3 and illustrates condition (1). In this case both current $i_L$ and $i_R$ are positive. Current $i_L$ flows from source terminal 2 through diode 15, SCR 24, diode 18 and returns to source terminal 1 through the load 12. Current $i_R$ flows from terminal 2 through diode 15, SCR 24, diode 33 and returns through resistor 35 to source terminal 1. In this case the load current and the resistor current add in the SCR 24.

Figure 2A:
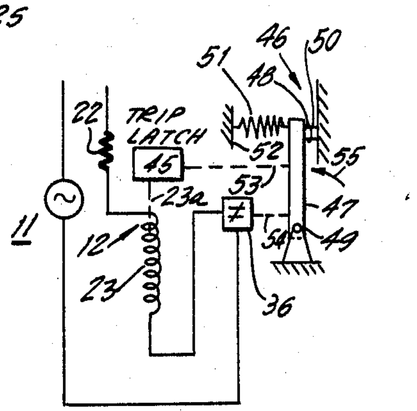
Figure 2B:
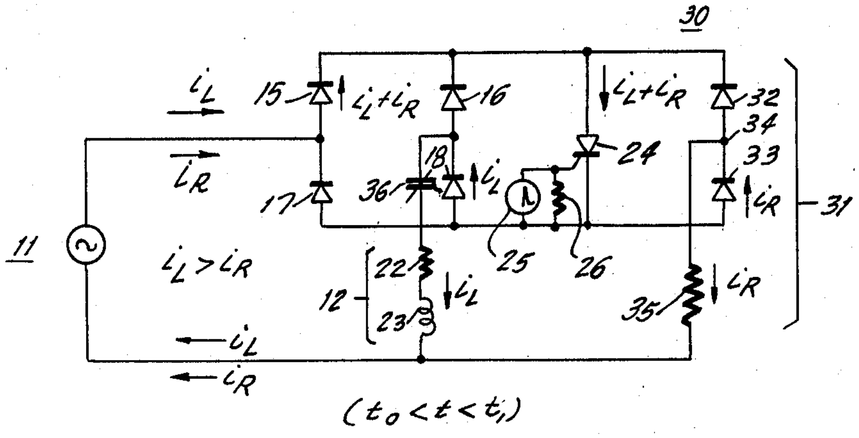
Figure 2C:
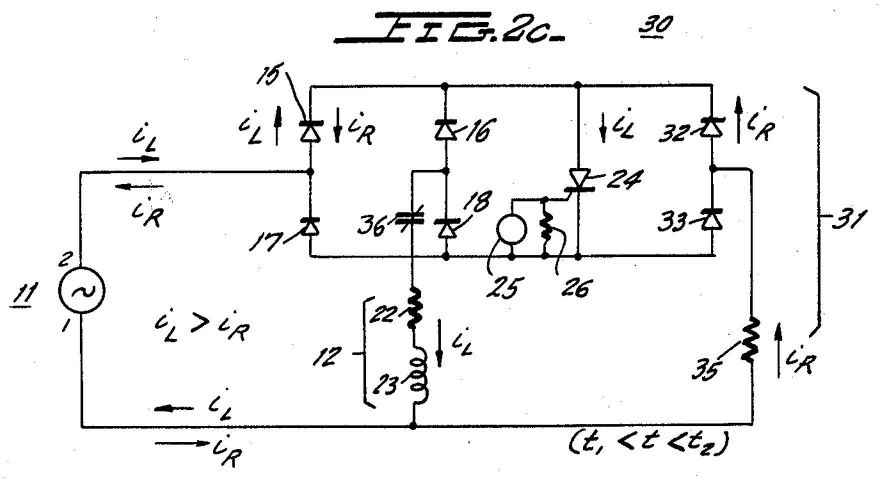

All the elements in FIGURE 2*c* are the same as in FIGURE 2*b* except the current condition is for the time interval ($t_1<t<t_2$). In this case $i_L$ is positive and larger than $i_R$ which is negative and, therefore, illustrates condition (2). Current $i_L$ flows from source terminal 2 through diode 15, SCR 24, diode 18 and returns to terminal 1 through load 12. The negative current $i_R$ flows from source terminal 1 through resistor 35, diode 32 and returns through diode 15 to source terminal 2.

Here current $i_R$ can flow in the non-conducting direction of diode 15 because $i_L$ is greater in magnitude than $i_R$ so that the net current in diode 15 is still in the conducting direction. $i_R$ in this case flows through only two diodes to return to the source and avoids the SCR which would impose on addition voltage drop. Consequently the SCR current is the larger current $i_L$.

Figure 2D:
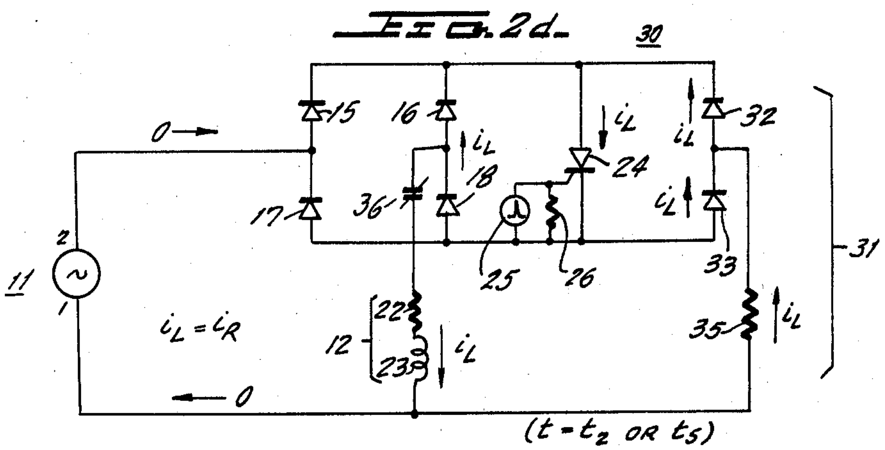

FIGURE 2*d* illustrates condition (3) where the source current is zero. In this case the inductive current $i_L$ is positive and flows through resistor 35, diode 32, SCR 24, diode 18 and returns to the inductive load 12. This occurs at $t=t_2$ in FIGURE 3.

Figure 2E:
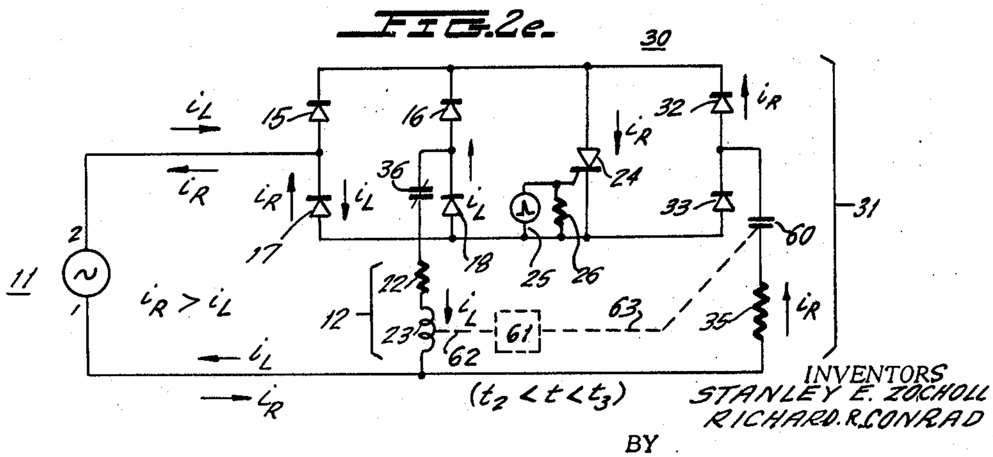

FIGURE 2*e* is condition (2) and holds for time interval ($t_2<t<t_3$) in FIGURE 3 where $i_R$ is negative and larger in magnitude than the positive flowing $i_L$. In this time period $i_R$ flows from source terminal 1 through resistor 35, diode 32, SCR 24, diode 17 and returns to source terminal 1. Current $i_L$ flowing in the opposite direction finds the path of least resistance by leaving source terminal 2 and flowing through diode 17 in the non-conduction direction. Again the net current through 17 is in the conducting direction because $i_R$ is larger than $i_L$. $i_L$ completes its circuit by flowing through diode 18, load 12 and back to terminal 1 of the source.

The overall function of the circuit 30 of FIGURES 2*b*–2*e* is to maintain positive current flow through SCR 24 at all instants of time so that the SCR will be prohibited from being driven into cut-off as would be the case with the SCR 24 in the circuitry 10 of FIGURE 1. The actual periods of time where such negative current flows, which are reverse in direction to the polarity of the diodes of the diode bridge network 14, occur are really quite brief in their time duration, and it can clearly be seen that the resultant current flow is always in the proper direction relative to the polarities of the diodes in diode bridge network 14.

Considering the wave forms of FIGURE 3, it can be seen that the resultant waveform 43 which represents the instantaneous current flowing through SCR 24 is always positive and clearly greater than zero so that the conduction of SCR 24 will be continuously sustained long after the termination of the trigger pulse applied to the gate electrode of SCR 24.

Turn-off of SCR 24 and hence decoupling of power source 11 from load circuit 12 may be accomplished through the normally closed switch means 36.

FIGURE 2*a* is a schematic diagram showing a portion of the circuitry of FIGURES 2*b*–2*e* reproduced and the manner in which is may be employed for operating a circuit breaker. As shown therein, the load circuit 12 is reproduced together with the normally closed switch means 36 and the manner in which it is connected to the lower terminal of power source 11. The inductive element 23 of load circuit 12 is shown as being comprised of a solenoid having an armature represented by the dotted line 23*a* which is mechanically linked to a trip latch mechanism 45 mechanically coupled as shown by the dotted line 53 so as to retain the movable bridge 47 of a circuit breaker assembly 46 in the normally closed position so that the cooperating contacts 48 and 50 thereof are retained in the engaged position. Contact 50 is shown as being mounted in stationary fashion, while contact 48 is connected to the upper end of movable bridge 47 which is arranged to be moved about its pivot point 49 under control of an opening spring 51 having a first end connected to the stationary point 52 and having its second end connected to movable bridge 47 and being fully charged at the time when the cooperating contacts 48 and 50 are in engagement.

The movable bridge 47 is mechanically linked to the normally closed contact 36, as shown by dotted line 54, so as to maintain contact assembly 36 normally closed when the movable bridge is in a position to maintain contacts 48 and 50 in engagement, and is further designed to open the normally closed contact assembly 36 when the movable bridge is operated under control of spring 51 to disengage contacts 48 and 50.

The operation of the circuit of FIGURE 2*a* (considered in conjunction with FIGURE 2*b*–2*e*) is as follows:

Let it be assumed that a trigger voltage is applied to the gate electrode of SCR 24. This will cause turn-on of SCR 24, and will further cause a current to be applied to the load branch circuit 12 from power source 11. This current will be sustained indefinitely for the same reasons as were previously described, due to the discrete difference in phase relationship between the currents passing through the resistive branch circuit comprised of resistor 35 and the load branch circuit comprised of resistive and inductive components 22 and 23, respectively.

Upon energization of the inductive element 23 which operates as the coil of a solenoid, its armature 23*a* is operated so as to cause trip latch mechanism 45 to release movable arm 47 through the mechanical linkage 53 therebetween. The release of this linkage causes the charged spring 51 to rotate movable bridge 47 to rotate counterclockwise about its pivot point 49, as shown by arrow 55, and thereby disengage the normally engaged contacts 48 and 50.

The normally closed contact pair 36 which is coupled to movable bridge 47 through the mechanical linkage designated by dotted line 54 is caused to move to the open position so as to interrupt the current path through the load branch circuit 12. It should clearly be noted that such interruption only occurs after a successful tripping of the circuit breaker 46 which is the prime function of the solid-state A.C. switching circuit. Since many circuit breakers require more than one half-cycle of a 60-cycle sine wave before moving to the fully disengaged position, the solid-state A.C. switching circuit of the instant invention thereby absolutely assures energization of the solenoid 23 for a period of time sufficient to assure successful tripping of the circuit breaker assembly 46.

Once the circuit breaker has tripped to its fully disengaged position and contact assembly 36 is moved to its open state, the only current flow permitted in the solid-state A.C. switching circuit 30 of FIGURE 2 will be through the resistive element 35. Thus, the next instant of time at which the current flow through SCR 24 will pass through the zero reference level 42 (see FIGURE 3), which occurs after a time duration no greater than one-half cycle from the opening of normally closed switch assembly 36, the SCR 24 will be driven to its non-conductive state and current flow from power source 11 will be cut off from the load circuit 12. It can thereby be seen that the solid-state A.C. switching circuit 30 of FIGURES 2*b*–2*e* is extremely advantageous for use with protective equipment in power distribution networks.

The circuit 30 of FIGURES 2*b*–2*e* may also be advantageously employed in controlling current flow to reactive networks. In such an application, let it be assumed that the inductor 23 represents a motor (or motors) driven by power source 11. In such applications, the circuit 30 of FIGURES 2*b*–2*e* is modified by coupling a switch means 60 in series with resistive element 35 (as shown in FIGURE 2*e*, for example). Energization of the load circuit 12 is accomplished in the following manner:

Switch means 60 is moved to the closed or engaged position, and a trigger pulse is applied through source 25 to the gate electrode of SCR 24. The normally closed switch assembly 36 of FIGURE 2 is not required in this particular application and may be replaced by a short circuit.

With switch 60 now in the closed position, the operation of the circuit 30 of FIGURE 2*e* will occur in the same manner as was previously described and current flow to load circuit 12 will be sustained indefinitely as the result of the phase relationship between the inductive and reactive current waveforms 40 and 41, as shown best in FIGURE 3. Let it now be assumed that a current of overload current magnitude is flowing in the load branch circuit 12. Suitable overload sensing means 61 which may be inductively coupled to the load branch circuit 12, as shown by dotted line 62, will recognize the overload current condition. The overload sensing means 61 is mechanically coupled to the now closed switch 60, as shown by the dotted line 63, so as to open normally closed switch assembly 60. As soon as the switch 60 is opened, only inductive current will flow in the circuit, which current, as represented by the current waveform 40 shown in FIGURE 3, will pass through the zero reference level 42 so as to turn off SCR 24. As soon as SCR 24 is turned off, current flow from power source 11 to the load branch circuit 12 will be interrupted in a period of time no greater than one-half cycle of current after the opening of switch means 60 so as to prevent any damage to those elements comprising load circuit 12. It can, therefore, be seen that the circuit arrangement 30 of FIGURE 2*e* may be advantageously employed as a solid state circuit breaker wherein the opening or disengagement of a closed switch in a branch circuit other than the load branch circuit operates to interrupt current flow to the load branch circuit being protected.

Figure 5:
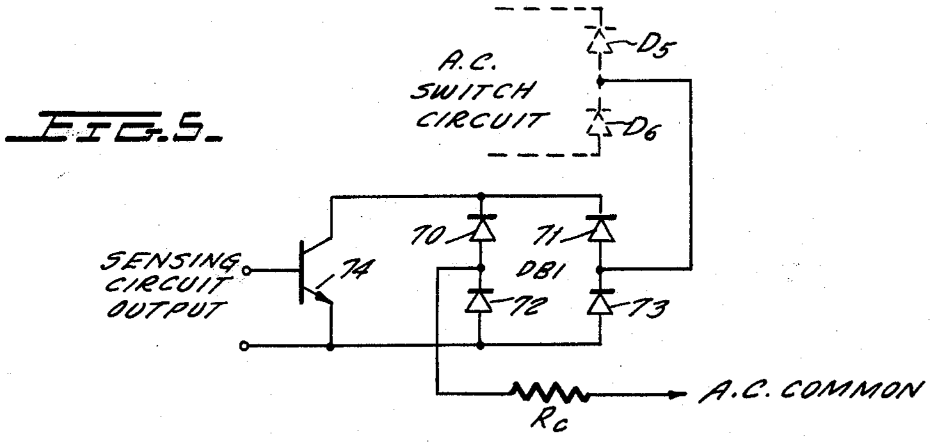
FIGURES 5 and 6 are schematic diagrams showing an A.C. control switch and a sensing circuit respectively.
Figure 7:
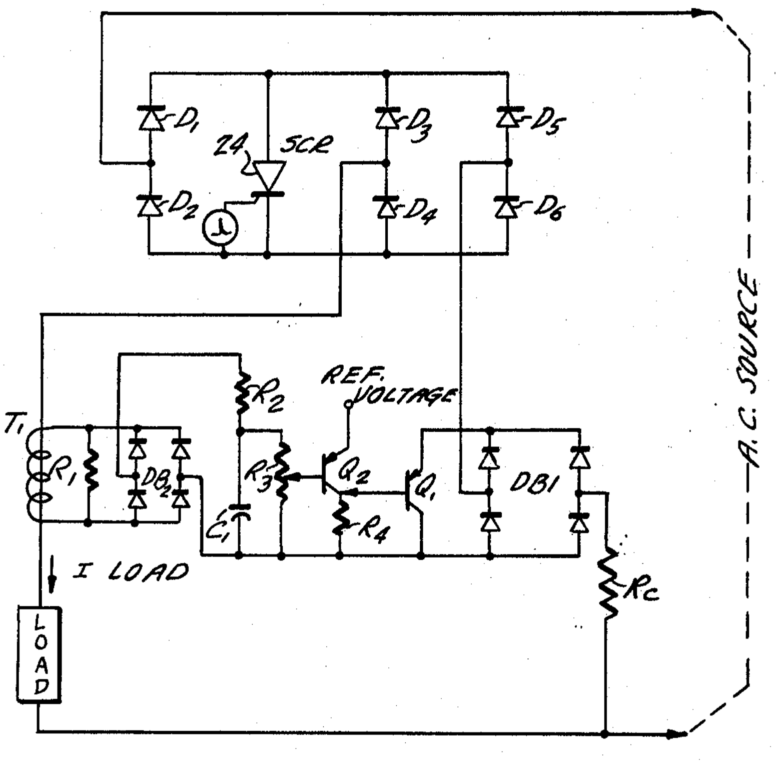
FIGURE 7 shows a modified circuit as compared with the circuitry of FIGURES 2 and 4 wherein solid state means are provided in the second branch circuit for controlling the flow of power to the load branch circuit and which combines the circuitry of FIGURES 5 and 6.

Further note that this circuit can be useful as a solid state circuit breaker (see FIGURE 7). The switch in the resistive circuit is replaced with a semiconductor circuit, such as shown in FIGURE 5. This circuit consists of four diodes 70–73 arranged as a full-wave bridge to convert the A.C. current to a D.C. current which can be controlled by transistor 74. Transistor 74 is controlled by a sensing circuit which develops a positive voltage between the base and emitter of 74 when the system is in a normal state. This turns transistor 74 on and thus allows the load circuit to be energized. If the system condition being monitored should develop an abnormality, the sensing circuit switches to a zero voltage output. This turns 74 off, thus causing the SCR 24 (see FIGURE 7) to shut off at the next current zero of the load circuit. Note that the SCR must be chosen such that it can turn off during the commutation time of the series diodes.

Figure 6:
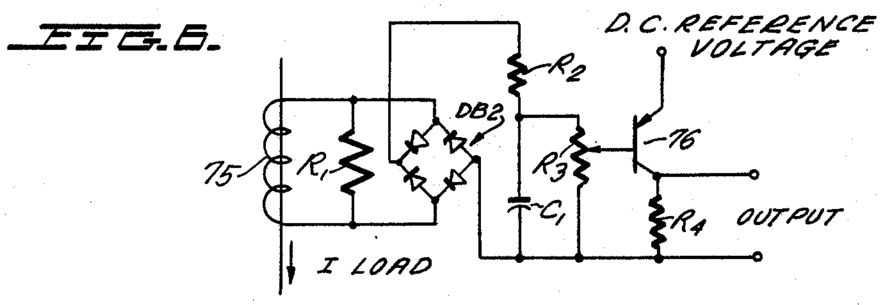

A typical sensing circuit is shown in FIGURE 6. This circuit can be used to protect the load from overcurrents. The circuits of FIGURES 5 and 6 may be combined in the manner shown in FIGURE 7 to yield a solid state circuit breaker.

Transformer 75 is used to measure the load current. It produces an output current proportional to the load current by its turns ratio. This current flows through R1 and establishes a voltage proportional to the load current. This A.C. voltage is converted to a filtered D.C. voltage by the diode bridge DB2, the series resistor R2 and the capacitor C1.

Transistor 76 is normally in an "on" state. Current flow through 76 and R4 develops the normal condition of positive voltage required to turn control switch 74 to the "on" state. If an abnormally high load current flows, and the resulting voltage on the base of 76 rises to a level equal to or greater than the reference voltage on the emitter, then 76 turns "off." Now the base voltage on control switch 74 drops to the zero voltage required to turn it off. Thus, the A.C. switch is turned off. Note that adjustment of the turn-off current can be achieved by either adjusting the voltage on the base of 76 or by adjusting the reference voltage on the emitter of 76.

The solid state A.C. switching circuits described herein have indicated that the load branch circuit 12 is primarily comprised of inductive reactance. It should be understood, however, that there is no absolute requirement that the load branch circuit be comprised primarily of inductive reactance and may, for example, be comprised of components making it primarily a capacitive reactance. Alternatively, load branch circuit 12 may be primarily resistive and the branch circuit containing resistor 35 may be primarily capacitive or inductive reactance.

The essential concept of the instant invention is that the impedances of the two branch circuits must be chosen so as to have a finite difference in phase angle insofar as the A.C. currents flowing through the branch circuits are concerned.

Figure 4:
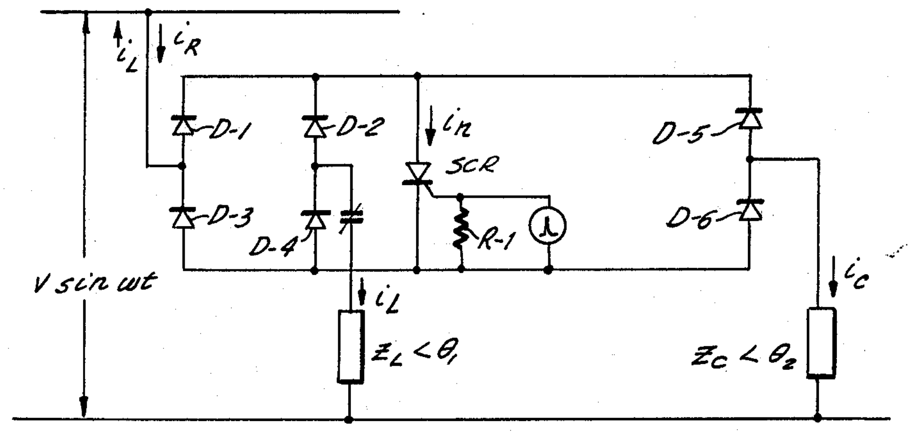
FIGURE 4 is a schematic diagram of a solid state A.C. switching circuit designed in accordance with the principles of the instant invention and useful in describing the manner in which the values of circuit parameters may be determined in order to provide successful operation of the circuit in a wide variety of applications.

FIGURE 4 shows a solid state A.C. switching circuit substantially similar to that shown in FIGURE 2 wherein the power source and the impedances of the two branch circuits are shown in generalized terms.

A design procedure to determine the magnitude and phase angle of the added impedance when the load impedance is known is as follows:

Let $\angle Z_L$ be the load impedance
$i_L$ be the load current
$Z_L\angle\theta_2$ be the impedance added
$i_c$ be the current in $Z_c\theta_2$
$V_{\sin}wt$ be the A.C. source voltage The fundamental design condition which allows the SCR minimum current to be greater than zero is:

$$(\theta_1-\theta_2)\neq n\pi \quad (n=0, 1, 2, 3 \ldots)$$

The minimum SCR current occurs where $$i_L=i_c$$

This value must equal the desired holding current, therefore $$i_L=i_c=i_h$$

Then $$\frac{V}{Z_L}\sin(wt+\theta_1)=-\frac{V}{Z_c}\sin(wt+\theta_2) \tag{1}$$

Equation 1 can be solved for $Z_c$ as a function of $\theta_2$ for known values of V, $i_h$, $Z_L$ and $\theta_1$. The more usual case where V, $i_h$, $Z_L$ and $\theta_1$, are known and $Z_c=R_c$ and $\theta_2=0$ is solved below.

In this case Equation 1 becomes $$\frac{V}{Z_L}\sin(wt+\theta_1)=-\frac{V}{R_c}\sin wt=i_h \tag{2}$$

solving for $wt$ gives $$wt=-\sin^{-1}\frac{R_c\sin\theta_1}{\sqrt{Z_L^2+2R_cZ_L\cos\theta_1+R_c^2}}$$

substituting for $wt$ in Equation 2 gives $$-\frac{V}{R_c}\sin wt=-$$

$$\frac{V}{R_c}\sin\left(-\sin^{-1}\frac{R_c\sin\theta}{\sqrt{Z_L^2+2R_cZ_L\cos\theta_1+R_c^2}}\right)=i_h$$

solving for $R_c$ gives $$R_c=\pm\left[\left(\frac{V}{i_h}\right)^2-Z_L^2\right]^{1/2}\sin\theta_1-Z_L\cos\theta_1 \tag{3}$$

It can, therefore, be seen that the instant invention provides a novel solid state A.C. switching circuit for coupling a sinusoidally varying power source to a load circuit wherein an additional branch circuit substantially in parallel with the load branch circuit provides an additional current path whose current is out of phase with the A.C. current flowing through the load branch circuit at any given instant of time so as to absolutely assure the fact that the resultant current flowing through the silicon controlled rectifier of the solid state A.C. switching circuit will always be positive and greater than zero to sustain current flow through the load branch circuit indefinitely, or at least until switch means provided in one of the two branch circuits is operated to disengage.

What is claimed is:

1. A solid state switching circuit for selectively coupling power between a series connected load branch circuit and source of A.C. power comprising:

a diode bridge network having a first pair and a second pair of terminals;

said first terminals being connected to said series connected circuit;

a semiconductor switch having first and second terminals and a control electrode;

said switch first and second terminals connected across said second pair of terminals;

the diodes of said diode bridge network being connected so that their conductive directions couple each half cycle of current from said source to said semiconductor switch;

means for applying a trigger pulse to said gate electrode to turn on said semiconductor switch;

a second semiconductor network having a first pair of terminals and a common terminal and being comprised of at least one semiconductor connected between one of said first pair of terminals and said common terminal;

said first pair of terminals being connected across the first and second terminals of said semiconductor switch;

an impedance means branch circuit connected between said load branch circuit and said common terminal;

the impedances of said load circuit and said impedance means being selected so that the A.C. currents passing therethrough are out of phase with one another to cause a positive current to pass continuously through said semiconductor switch.

2. The solid state A.C. switch means of claim 1 further comprising switch means in circuit with one of said branch circuits being operable between an open and a closed position to control the flow of sustained current between said power source and said load branch circuit.

3. The circuit of claim 1 wherein said semiconductor switch is a silicon controlled rectifier.

4. The circuit of claim 1 wherein said diode bridge network is comprised of a plurality of diodes, each being connected between one of said input and output terminal pairs.

5. The circuit of claim 1 wherein said semiconductor network is further comprised of a second semiconductor; each of said semiconductors having a first terminal connected to said common terminal and having a second terminal connected respectively to an associated one of the pair of terminals of said semiconductor network.

6. The circuit of claim 2 wherein said load branch circuit is comprised of a solenoid coil;

an armature controlled by said solenoid coil;

a circuit breaker having a trip latch controlled by said armature;

means linking said third switch means to said circuit breaker for opening said third switch means upon tripping of said circuit breaker to disconnect said power source from said load branch circuit.

7. The circuit of claim 3 wherein said third switch means is coupled in said second branch circuit, said third switch means being closed to sustain conduction of said semiconductor switch initiated by application of a trigger pulse to said control electrode by said trigger pulse source.

8. The circuit of claim 7 further comprising means for sensing an overload in said load branch circuit; and means coupling said overload sensing means to said third switch means for opening said third switch means in the presence of an overload current condition.

9. The circuit of claim 1 wherein said power source generates a voltage $v$ where:

$V=V \sin wt$;

the impedances of said load and second branch circuits being $Z_1<\theta_1$ and $Z_c<\theta_2$ where $Z_1<\theta_1$ is known and $Z_c<\theta_2=R_c<\theta_2=0$ the impedance of said load branch circuit being known said second branch circuit impedance being selected so that $$R_c=\pm\left[\left(\frac{V}{i_h}\right)^2-Z_1^2\right]^{1/2}\sin\theta_1-Z_1\cos\theta_1$$

where $i_h$ (holding current) $=i_1=i_c$.

References Cited

UNITED STATES PATENTS

| | | | |
|---|---|---|---|
| 3,210,605 | 10/1965 | Jones | 317—33 |
| 3,222,578 | 12/1965 | Thiele | 317—148.5 |
| 3,250,891 | 5/1966 | Pease | 317—148.5 XR |
| 3,315,135 | 4/1967 | Thiele | 317—148.5 |
| 3,321,641 | 5/1967 | Howell | 317—33 XR |
| 3,385,973 | 5/1968 | Abrams et al. | 307—38 |

LEE T. HIX, Primary Examiner

W. M. SHOOP, Jr., Assistant Examiner

U.S. Cl. X.R.

307—252, 305; 317—148.5